E. A. GREEN.
NUT RETAINER.
APPLICATION FILED MAY 7, 1914.
1,183,555. Patented May 16, 1916.
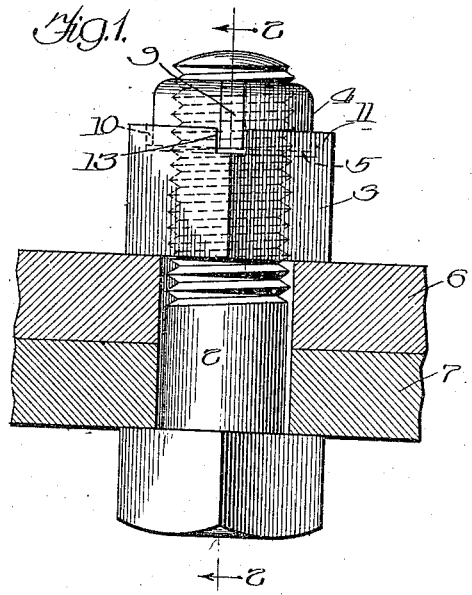
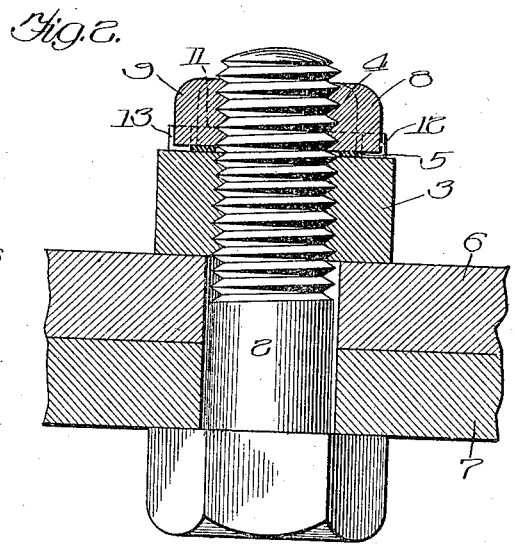
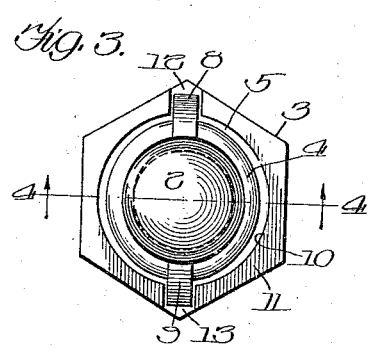
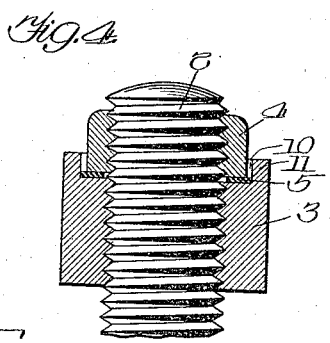
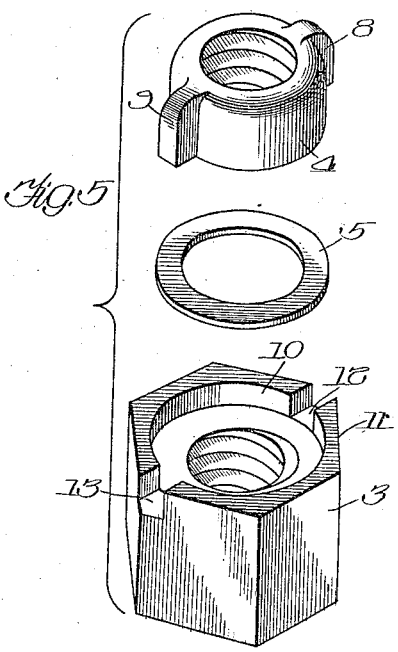
Witnesses:
Inventor:
Edward A. Green

UNITED STATES PATENT OFFICE.

EDWARD A. GREEN, OF CHICAGO, ILLINOIS.

NUT-RETAINER.

1,183,555.  Specification of Letters Patent.  Patented May 16, 1916.

Application filed May 7, 1914. Serial No. 836,849.

*To all whom it may concern:*

Be it known that I, EDWARD A. GREEN, a citizen of the United States, residing at Chicago, in the county of Cook and State of Illinois, have invented certain new and useful Improvements in Nut-Retainers, of which the following is a specification.

This invention relates to a threaded bolt, its nut and a retainer for the latter designed to be held against rotary movement on the bolt, and to be relieved of a bearing contact with the nut longitudinally of the bolt shaft.

The principal objects of the invention are to reduce the cost of manufacture of this type of retainer, to increase the wrenching surfaces of the nut, to obtain a neater and more compact construction, to diminish the quantity of metal that must be removed from the nut for the purposes of this type of retainer, to cause the nut to serve as a guide for the retainer, and to provide these improvements without reducing the strength of the nut below that of the bolt.

With the above objects in view the invention consists in the novel construction, combination and arrangement of parts hereinafter described in detail, illustrated in the accompanying drawing and incorporated in the appended claims.

In the drawing—Figure 1 is a side view of a bolt, nut and retainer applied to two pieces of material shown in section. Fig. 2 is a section taken substantially on line 2—2 of Fig. 1. Fig. 3 is a top plan view of bolt, nut and retainer. Fig. 4 is a section taken substantially on line 4—4 of Fig. 3. Fig. 5 is a perspective view of the nut, retainer and water-proofing washer separated.

In the several views 2 represents the bolt, 3 the nut, 4 the retainer and 5 a washer which may be inserted between the nut and the retainer. The work or material to which the nut and bolt are shown applied is designated as 6 and 7. The nut may be of usual form and dimensions, and the retainer is of tubular form. Projecting from the periphery of the latter are preferably two lugs 8 and 9. This retainer is inexpensively made from a rod rolled with a pair of ribs, cut into short lengths and punched and threaded. One face of the nut 3 is counterbored to form a recess 10 adapted to receive the body of the retainer and in a flange 11 formed by the counterboring, recesses 12 and 13 are cut to receive the lugs 8 and 9. After the bore of the retainer has been threaded the retainer is slightly distorted at preferably two opposite points in its circumference by pressing these points toward each other. This distortion from a true circle causes the threads of the retainer and the bolt to bind and hold the retainer against rotation relative to the bolt. The retainer should possess sufficient resiliency to enable it to compensate for wear in the threads and make it possible to remove and re-apply it without losing its effectiveness.

The nut and the retainer are threaded together upon the bolt, the retainer being mounted in the recess 10 and supported laterally by its circumferential wall in substantial alinement with the bolt opening in the nut. It will be noticed that in counterboring the nut to form the recess 10 none of the wrenching surfaces or outer sides of the nut are removed beyond the very small portions cut out in forming the lug recesses 12 and 13. The strength of ordinary nut threads is greater than that of the bolt threads. It has been held that the average nut may be counterbored one-half the distance of its threaded bore and still retain a thread strength equal to the strength of the bolt. The retainer may thus be located partly within the nut without depriving the latter of its required efficiency. The recesses 12 and 13 in the nut are so disposed with respect to the lugs 8 and 9 on the retainer that the latter will not engage with the threads of the bolt so as to force it into such close contact with the nut or the bottom of the counterbore as to make the retainer bear any appreciable strain imposed upon the nut longitudinally in the direction of the retainer. It is designed that the only places of positive or bearing contact between the nut and retainer shall be between the lugs 8 and 9 and the side faces of the recesses 12 and 13. By reason of these lugs and recesses the nut and retainer must rotate together upon the bolt threads, but while the distortion of the retainer threads causes them to bind upon the bolt threads with sufficient force to prevent accidental movement of the retainer, it requires only a slightly greater effort to move the nut and the retainer with the aid of a wrench applied to the nut than is required to move the nut alone. On the other hand the vibrations which the nut may be subjected to will not cause rotation of the retainer because of the grip which the threads of the retainer have upon the bolt threads.

In Figs. 1, 2 and 4 a ring or washer 5 is shown interposed between the nut and retainer, and the space between nut and retainer occupied by this washer may represent a substantially non-contact space, as this washer is designed to be made of a soft or fibrous substance, grease or other plastic material. The object of this washer is to exclude water collected in the recess 10 from reaching the bolt and nut threads from said recess. Ordinarily no washer or such means for excluding moisture is more necessary in connection with this invention than in connection with nuts and bolts generally, but in such situations where such protection against moisture is desirable the counterbore 10 affords a convenient and useful means to that end especially when the space represented by the washer 5 is filled with heavy grease. The space serves as a retaining cup and protection for a delicate washer of the kind indicated, or, in other words, the recessed nut and retainer coöperate when the washer is used as an efficient stuffing box to the extent needed for the exclusion of moisture not under pressure.

The greater compactness obtained by letting part of the retainer into the nut makes it possible to reduce the length of the bolt to that extent, a not inconsiderable item where large quantities are manufactured. As already pointed out the conventional nut is made thicker than is necessary to give it the required strength relative to the bolt, and this simply for the purpose of providing the nut with sufficient wrenching surface. In the present invention most of this excess metal is cut away without loss of the usual wrenching surface, and with a gain of the other advantages above referred to.

I claim as my invention—

1. In combination, a nut, a retainer threaded on the inside and compressed to distort its threads and cause same to grip the threads of a member to which it is applied, said nut having a counterbored recess in which said retainer is seated and notches, said retainer having lugs which engage said notches.

2. In combination, a threaded bolt, a nut, and a separate retainer threaded upon said bolt, said retainer being partly within said nut and together with the latter forming a space adapted to be occupied by a packing, said retainer having distorted threads which engage the threads of the bolt.

3. In combination, a threaded bolt, a nut having a counterbore in its crown face and in threaded engagement with said bolt, and a tubular retainer having threaded engagement with said bolt partly outside and partly inside of said nut, said retainer having walls of substantially uniform thickness to facilitate its compression, the retainer threads being distorted from a true circle to cause them to bind upon the bolt threads, and engaging means upon said retainer and nut to cause them to rotate together.

4. In combination, a bolt, a retainer which has threaded engagement with said bolt, a nut free of bearing contact with said retainer longitudinally of the bolt shaft and interlocked with said retainer, and means for preventing the entrance of moisture between adjacent faces of said nut and retainer.

5. In combination, a nut, a bolt, a retainer having distorted threads that grip the threads of the bolt, said retainer and nut being separate members interlocked rotatably but free of each other longitudinally of the bolt shaft, and a packing chamber between said retainer and nut.

6. In combination, a bolt, a counterbored nut, a tubular retainer seated in the counterbore and having threads relative to the threads of the bolt, means preventing bearing contact between said retainer and nut longitudinally of the bolt shaft, and an annular chamber in the bottom of said counterbore which spaces apart adjacent faces of nut and retainer.

7. In combination, a threaded bolt, a counterbored nut threaded upon said bolt, a retainer seated at least partly within said nut and having distorted threads which grip the threads of the bolt, a cushion packing between said retainer and nut, and lugs and recesses on said retainer and nut which engage each other when the nut is rotated but leave the retainer free of the nut in the direction of their longitudinal axis.

8. In combination, a threaded bolt, a counterbored nut, a retainer occupying the counterbore save an annular space at the bottom thereof between the parallel adjacent faces of retainer and nut, oppositely extending lugs on said retainer, means upon the nut for rotatably interlocking same with said lugs, and threads upon the retainer which are bent from a true circle against the threads of the bolt.

9. In combination, a threaded bolt, a nut, and a retainer for the nut which consists of a tubular threaded member having its threads distorted from a true circle, the nut and the retainer partly telescoping each other loosely, and the nut and retainer being provided with means which prevent their interengagement longitudinally of the bolt shaft and interlock said nut and retainer when rotated about said bolt shaft.

10. In combination, a recessed nut, a bolt, and a separate retainer loosely occupying the recess of the nut and providing a chamber between the retainer and the nut adapted to confine a packing substance, the retainer being tubular in form and having its threads equally distorted throughout its entire length by compressing the retainer at two opposite points in its circumference whereby the retainer threads are brought out of line with the bolt threads and caused to bind on the latter, and means for preventing the nut from rotating on its threads into a bearing contact with the retainer that transmits to the retainer the strains imposed upon the nut in a direction longitudinal of the bolt shaft.

11. As an article of manufacture, a nut having parallel sides for adjustment and removal and being provided upon the crown of the nut with a counterbore, a recessed flange about said bore, a tubular and threaded retainer of resilient material less in thickness than the nut, said retainer constructed and arranged to engage said flange at substantially right angles to the axis of rotation of the nut, said retainer having its threads distorted by compression at two opposite points, the threads of the retainer being so disposed that when the nut and the retainer are applied to a threaded member the retainer will be spaced from the face of the nut and in engagement with the flange of the nut, whereby the pressure on the nut will not be transmitted to the retainer longitudinally of the bolt shaft.

12. As an article of manufacture, a nut having parallel sides for adjustment and removal and having a crown counterbore and a flange about said bore with oppositely disposed recesses therein, and a threaded retainer substantially oval in cross section and made of resilient material, said retainer being adapted to occupy said counterbore and provided with projections to be engaged with said recesses, said retainer having its threads distorted by compression of the retainer, the retainer and nut being slightly spaced apart and providing between said flange, periphery of retainer, crown of the nut and opposing face of retainer a substantially inclosed space adapted to contain a semi-fluid packing.

In testimony whereof I have hereunto set my hand in the presence of two subscribing witnesses.

EDWARD A. GREEN.

Witnesses:
JOHN P. ANTISDEL,
CARL A. PETERSON.

Copies of this patent may be obtained for five cents each, by addressing the "Commissioner of Patents, Washington, D. C."